United States Patent [19]
Chicha

[11] Patent Number: 5,632,572
[45] Date of Patent: May 27, 1997

[54] GUIDANCE APPARATUS AND METHOD FOR ANADROMOUS FISH

[76] Inventor: George S. Chicha, S. 5930 Meadow La., Spokane, Wash. 99204

[21] Appl. No.: 541,108

[22] Filed: Oct. 11, 1995

[51] Int. Cl.⁶ ............................................. F02B 8/08
[52] U.S. Cl. ................ 405/81; 405/80; 119/219
[58] Field of Search ................ 405/80–82, 73, 405/74; 119/219, 220

[56] References Cited

U.S. PATENT DOCUMENTS

| | | | |
|---|---|---|---|
| 510,713 | 12/1893 | Scott | 405/73 X |
| 2,751,881 | 6/1956 | Burkey | 119/219 |
| 2,761,421 | 9/1956 | Burkey | 119/219 |
| 3,772,891 | 11/1973 | Raistakka | 405/83 |
| 4,260,286 | 4/1981 | Buchanan | 405/82 |
| 4,437,431 | 3/1984 | Koch | 405/81 |
| 4,629,361 | 12/1986 | Zimmerman | 405/83 |
| 4,740,105 | 4/1988 | Wollander | 405/81 X |
| 5,161,913 | 11/1992 | Boylan | 405/83 |
| 5,433,554 | 7/1995 | Minakami et al. | 405/81 |

FOREIGN PATENT DOCUMENTS

| | | | |
|---|---|---|---|
| 1375721 | 2/1988 | U.S.S.R. | |
| 1599468 | 10/1990 | U.S.S.R. | 405/81 |

Primary Examiner—Tamara L. Graysay
Assistant Examiner—Frederick L. Lagman
Attorney, Agent, or Firm—Keith S. Bergman

[57] ABSTRACT

Migrating anadromous fish, and particularly salmonoid smolts, are guided in or by elongate faster moving channels defined in a body of slower moving water. Ring-like support frames are supported by floats and anchors in a water body at spaced distances along a faster moving channel to be defined. Each support frame carries one or more nozzles that receive pressurized water from a water supply system and disperse that water toward the next spacedly adjacent downstream support frame to define the faster moving channels without use of physical peripheral boundary members. The water supply system may be associated with individual support frames or with a plurality of support frames to receive water from the body in which the faster moving channel is defined and pressurize that water for dispersement. Fish are introduced into the upstream portion of the faster moving channel and instinctively tend to remain within the channel so long as the faster water motion exists therein. The system may be used to direct fish movement through small areas or large dam backwaters and is particularly adaptable to surface oriented fish channelization.

6 Claims, 1 Drawing Sheet

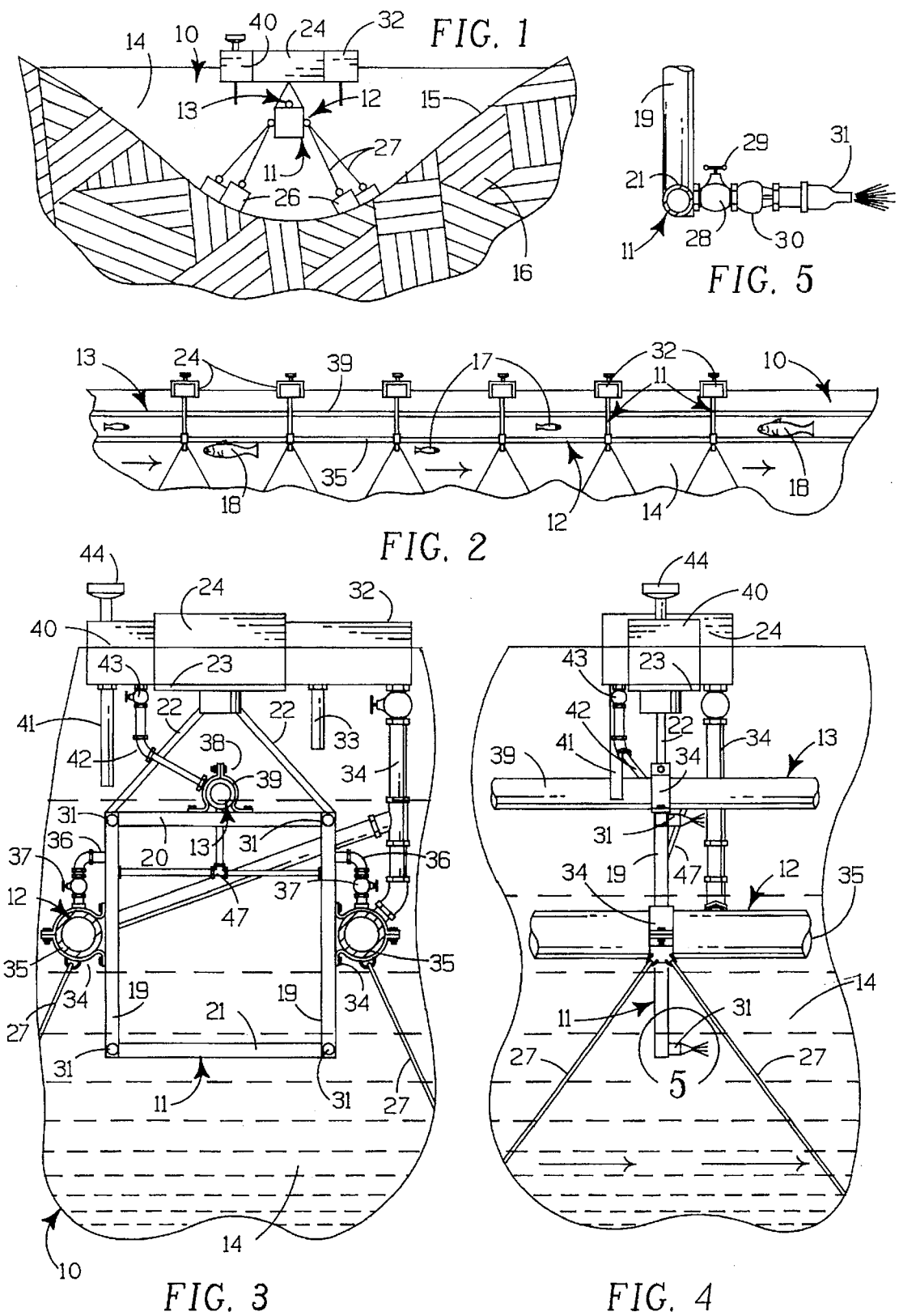

GUIDANCE APPARATUS AND METHOD FOR ANADROMOUS FISH

BACKGROUND OF INVENTION

1. Related Applications

There are no applications related hereto heretofore filed in this or any foreign country.

2. Field of Invention

This invention relates generally to the guidance and transit of anadromous fish during migration in a watercourse, and especially to such guidance and transit of salmonoid smolts in a faster moving channel defined in a slower moving watercourse without physical barriers defining the periphery of the water course.

BACKGROUND AND DESCRIPTION OF PRIOR ART

The Columbia River Basin of the Northwest United States provides a complex drainage system that in its natural state provided a habitat for great numbers of anadromous species of fish and especially those of the family Salmonidae. Since the introduction of dams into that drainage system in 1938, the number of salmon using the system has continually declined from an estimated population of possibly twenty million fish in the original state of the system to two or three million fish at the present time, more than half of which are hatchery reared. The decimation of this resource has received much attention politically, economically, environmentally and otherwise, though notwithstanding the expenditure of billions of dollars on remedial efforts the problem continues. Other drainage systems having resident anadromous fish that have been similarly altered by man have had similar histories.

A substantial, and probably the principal, causative factor for the problem is the transport of fish through the ecosystem as modified and changed by dams, and especially tile transport of smolts from fresh water rearing areas to salt water. The instant invention seeks to provide a new and novel method and apparatus to aid and enhance that transport through such modified drainage systems.

Smolts in their native state habitually traveled from their fresh water spawning areas through a drainage system to the ocean during a relatively short time period of three to six weeks during the spring runoff, while being aided by the larger volume and higher velocity of the water at that time period. In dammed drainage systems, however, both the volume and velocity of waterflow are lessened from their pre-dam state to substantially delay the transit time for smolts through fresh to salt water to a period that commonly extends beyond six weeks and possibly to several months. The smoltification process generally must be completed in a period of about thirty to forty-five days as it naturally was if it is to be as effective because the smolts after that period tend to lose both their desire to migrate to salt water and their physiological ability to adapt to a salt water environment.

During the smolt migration period the general environmental conditions created by a dammed drainage system also tend to be environmentally adverse to the smolts. The storage areas behind dams create slack water conditions that are ideal for predators and aid the predators in predatizing the smolts. The slack water also tends to confuse the instinctual migratory process as the smolt's motion is controlled and directed to some degree by higher velocity current which is not present in slack waters. A dam itself provides physically destructive forces in its inlet area which normally is at a substantial depth of often one hundred feet or more below the level of the slack water behind the dam. A dam outlet area has substantial water flow directed toward it which tends to direct and move the smolts to that area where they may be injured or killed by fish screens, or worse by turbines if screens are not present. If the smolts pass through fish outlets in the lower dam level, the length and turbulence of tunnel and spillway areas provide a high potentiality for smolt injury, and at best leave the smolts substantially stressed to lessen their later vitality and make them more susceptible to predatization and the excessive entrained air in spillways. If the smolts are not physically prevented from entering the penstocks, they face the potential of substantially greater damage from moving through turbines and the turbulent areas created thereby and existent therein.

The instant invention seeks to alleviate or ameliorate these problems by creating elongate channels of more rapidly moving water within a slower moving water course, such as the back water of a dam in a river. This more rapidly moving water channel tends to attract migrating fish into its interior because of an anadromous fish's natural tendency to seek faster moving currents during its migratory movement. The faster moving channel also tends to better simulate the natural environment of smolts during migration to better accommodate the smolts'physiological processes while using the normal water carried in the water course to aid in imprinting the fish with its homing instincts. Such faster moving channels also allow the direction of fish travel along predetermined courses which in the case of smolts may be determined to maintain the smolts at a distance from dam intakes and other areas where they might be physically harmed. The channels also allow direction of smolts in particular areas where they may be easily captured or moved to aid in subsequent artificial transportation processes. If the more rapidly moving channels are created over sufficient portions of a migratory water course, they also will shorten the transit time of smolts from the rearing grounds to estuaries to maintain such times within the limits of the normal smoltification process.

Most prior work that has been concerned with smolt migration has provided transportation aids or protective devices in the immediate vicinity of dams. The transportation aids have taken various forms but generally have provided channels for smolt passage through or around a dam or have provided means for capturing smolts for subsequent physical transport to a point downstream from the dam for subsequent release. The protective devices generally have taken the form of physical barriers such as nets, screens or like devices that prevent smolt entry into intake orifices or channels where they may be physically harmed. The instant invention in contradistinction defines channels of faster moving water anywhere in a dammed drainage system and especially in slack water areas, not only to direct fish transport but also to provide an enhanced environment for smolts during that transport. The instant invention does not conflict with such other known protective devices or transportation aids but rather each may be compatible and useful with others in a synergistic fashion.

The channels that have heretofore been created in water courses to direct the course of travel of anadromous fish to protect them or direct their motion generally have accomplished their purposes with physical barriers such as pipes, tubes or the like defining the periphery of the channel. The waterflow in such channels has been similar to and not much if any greater than the general waterflow in the body of water at the ends of the channel. The instant invention in contradistinction is operative in channels that have no physical barriers defining their peripheries and provides waterflow in the channels that is of appreciably greater velocity than the waterflow in a body of water wherein the channel is defined.

The instant type of channelization allows fish to enter the faster moving channel not only at its upstream end but also along its entire course to increase the probability of fish entry into a channel and their continued transit therein by reason of the fish's instinct to enter and follow faster moving water channels. The faster moving channel also may enhance fish environment not only by its very existence but also by allowing environmentally enhancing materials to be introduced into and maintained within the channel either from about its peripherally adjacent water course or from a separate enhancement system that may be associated therewith.

My invention lies not in any one of these features individually, but rather in the synergistic combination of all of the features which necessarily give rise to the functions flowing therefrom.

SUMMARY OF INVENTION

My invention generally provides a channel in a water course that moves with greater velocity than the body of water in which the channel is defined. I provide a plurality of stations at spaced distances along the higher velocity channel to be defined, each station being positionally maintained in the watercourse by floats and anchors. Each station is serviced by a pressurized water supply system that provides water derived from the watercourse in which the channel is defined and disperses that water at the station through one or more nozzles to define the faster moving channel. If a station has a single dispersement nozzle, that nozzle preferably is supported in a medial position in the channel and if a station has plural nozzles, they preferably are distributed spacedly about the periphery of the faster moving channel. Pressurized water is provided by pumps that may be associated with individual stations or with a plurality of adjacent stations serviced by an interconnecting pressurized water supply system. Water flow in the faster moving channel is maintained at a velocity higher than that of the water body in which the channel is defined and preferably at an absolute velocity of between two to ten feet per second. An auxiliary supply system may service the higher velocity channel to beneficiate the environment for fish therein such as by providing food, oxygen, medications and the like.

In providing such a system, it is:

A principal object to create a faster moving channel in a watercourse, especially in a slack area such as behind a dam, that aids the migration of anadromous fish by directing their course of travel, decreasing their time of transit through the migration course and providing a channel that is more environmentally suited to the fish during their migration than is the water course in which the channel is defined.

It is a further object to create such a channel that need not have a physical peripheral boundary which allows fish to enter the channel not only from an upstream end, but also from along its course of definition to provide greater efficiency for fish transport than does a physically defined channel.

A further object is to provide such a channel wherein velocity is imparted to water within the channel by injection of pressurized water, derived from the body in which the channel is defined, into the channel through jet-type nozzles to maintain the channel's peripheral definition.

A further object is to provide such a channel that may have physical barriers about a portion of its periphery to protect and direct fish from predators and to increase efficiency by decreasing the fluid friction between a water body and the water moving at greater velocity along the channel periphery.

A further object is to provide such a channel that may be provided with materials that beneficiate the environment within the channel for fish, such as by providing food, oxygen, medicaments, or the like.

A still further object is to provide such a system that has plural spaced stations positionally maintained along its course to carry one or more jet nozzles to directionally disperse pressurized water toward the next spacedly downstream station to define and create a water velocity in the channel greater than that of the water body in which the channel is defined, and generally absolutely between two to ten feet per second.

A still further object is to provide such a system wherein each station may be serviced by individual pumps or a plurality of adjacent stations may be serviced by a single pump interconnected to the plurality of stations for the supply of pressurized water.

A still further object is to provide such a system that may be positioned to direct the course of travel of fish within the pressurized channel to keep the fish away from areas such as dam inlets or predator habitat and to allow delivery to a particular area for further transport, counting or the like.

A still further object is to provide such a system that may not only service smolt migration downstream in a drainage system, but also may service upstream migration of adult fish by reason of the higher velocity current sensing instincts of either fish.

A still further object is to provide such a system and apparatus that are of new and novel design, of rugged and durable nature, of simple and economic manufacture and otherwise well suited to the uses and purposes for which they are intended.

Other and further objects of my invention will appear from the following specification and accompanying drawings which form a part hereof. In carrying out the objects of my invention, however, it is to be understood that its features are susceptible to change in design and structure arrangement, with only a preferred and practical embodiment being illustrated and specified, as is required.

BRIEF DESCRIPTIONS OF DRAWINGS

In the accompanying drawings which form a part hereof and wherein like numbers of reference referred to similar parts throughout:

FIG. 1 is a somewhat idealized transverse cross-sectional view through a watercourse such as a river, showing my system in place therein.

FIG. 2 is a somewhat idealized elongate cross-sectional view through a portion of the watercourse of FIG. 1 showing the relationship of various stations.

FIG. 3 is a somewhat enlarged orthographic transverse view of the downstream side of a station positioned in a water course, showing various of its parts, their configuration and relationship.

FIG. 4 is a somewhat enlarged orthographic side view of tile station of FIG. 3.

FIG. 5 is a somewhat enlarged orthographic view showing a nozzle and its interconnection to the station of FIG. 4, taken within the circle labeled 5.

DESCRIPTION OF THE PREFERRED EMBODIMENT

My guidance system generally provides a faster moving channel created in watercourse 10 by means of plural spaced channel stations 11 that are serviced by pressurized water supply system 12 and water conditioning system 13, Watercourse 10 is part of a drainage system that moves water from continental uplands to an adjacent salt water basin. Such watercourses take many and various forms, but in essence provide a flowing body of water 14 contained in a channel 15 defined in the earth 16. Such watercourses in which my invention is used have flowage rates of generally less than ten feet per second and substantial cross-sectional areas, such as are created by man-made improvements in the watercourses as by the back waters of dams. It is possible that my guidance system may operate in flowages of greater or lesser velocity, but in general it is not needed in those areas and the system may tend not to be economically efficient in such areas because of higher power requirements and substantial losses by turbulence along the peripheral area of the more rapidly moving channel. The type of watercourse described provides habitat for migrating salmonoid smolts 17 and adult salmon 18. A typical cross-section of such a body of water may provide areas of flow with substantially differing velocities and in such channels, my guidance system may be feasible in some areas while not in others.

Channel stations 11 provide a peripherally defined body frame formed by interconnected similar vertical sides 19 and horizontal top 20 and bottom 21, all structurally joined at their adjacent end portions to form a closed structure, as illustrated in FIG. 3. Similar angled supports 22 extend upwardly and inwardly from the upper corners of the body frame to structural interconnection with support plate 23 carried by float 24. In the instance illustrated the body frame is formed of tubular pipes defining internal channels at least in sides 19 to provide a continuous channel to receive pressurized water and act as a plenum for its dispersement. It is possible that where heavier, stronger construction may be required, the body frame may be formed as a compound structure having two separate parts (not shown), the first comprising a peripheral frame of beams and the second comprising an adjacent pipe structure supported by that beam frame, but for most conditions a single frame formed of steel pipe is sufficient. The elements of such a pipe frame are joined by welding or by traditional pipe fittings as desired. The angled supports 22 and support plate 23 are formed of metal and if so, these elements in the body frame are structurally interconnected by known mechanical fasteners or by welding.

Float 24 must be of such nature and volume as to support the channel station in a body of water, spacedly below the surface of that water and preferably with a portion of the float structure projecting thereabove. Most common float structures and materials of present day commerce having the appropriate physical characteristics are sufficient for this purpose and may be used in my channel stations. The float of preference is one formed of semi-rigid polystyrene with a peripheral casement to provide greater durability and allow easy fastening of ancillary structures such as support plate 23 to the float.

One or more anchors 26 are attached to each body frame or associated float to aid positional maintenance of channel stations in a body of water. Each anchor carries a tethering cable 27 which is mechanically fastened to the channel station, in the instance illustrated by a fastener carried by a water supply pipe support. the tethering cables must provide for variations in level of the water course according to known principles. The anchors in the instance illustrated in FIG. 1 are four in number and arrayed in spaced adjacency on the channel surface defining the water course to provide positional maintenance for the channel station, but depending upon local conditions of a particular channel station, anchors may not be required at all and varying numbers of anchors may be required for appropriate positional maintenance. The anchors preferably are of common known design and for simplicity and economy are formed of concrete material. The particular detailed nature of the anchors is not critical to my invention so long as they fulfill their purpose of positionally maintaining the channel stations in a watercourse.

The elements forming each body frame carry one or more nozzle structures, one of which is illustrated in FIG. 5. The vertical side 19 of the body frame carries valve 28 having control knob 29 to regulate passage of pressurized water to outwardly adjacent, universally articulating joint 30, which in turn interconnects nozzle 31 for adjustable positioning relative to the joint 30. These various fixtures are individually known in the plumbing arts, readily available in present day commerce, and serve their ordinary functions in my invention. Various nozzles 31 may be used with my device, but in general all require adjustable mounting to allow appropriate positioning to properly define the periphery of the faster flowing channel, even though preferably it is somewhat the same cross-sectional shape as the body frame.

The amount of water dispersed through the various nozzles, its velocity and direction determine the required spacing of adjacent body frames and this spacing is important to the economic and practical functioning of my system. Types of nozzles that create a high pressure output with a relatively narrow cone of expansion aid in maintaining a better defined periphery between my faster moving channel and the watercourse in which it is defined, but such nozzles generally create substantial turbulence and require substantial power, so that all of the nozzle parameters require optimization to create the best functioning system. The methods of determination of these parameters are known in he hydraulic arts and are within the ordinary skills of present day hydraulic engineers.

Pressurized water supply system 12 provides pump 32, in the instance illustrated structurally joined to float 24 for support on the float. This interconnection, however, is not necessary and the pump may be an independent structure spacedly distant from either the float or the channel station, if desired, and it may even be supported on the earth 16 defining the watercourse channel 15 or surrounding it (not shown). The pump itself is of a commercially available type that provides a sufficient volume of water at appropriate pressure to operate my system. The pump has intake pipe 33 communicating to the water body 14, preferably outside of the faster moving channel that my invention defines in the water body. The output of the pump passes from output conduit 34 to ultimately supply pressurized water to the channel defined in or supported by one or more body frames.

In the pressurized water supply system illustrated, the laterally outer portion of each vertical side 19 of the body frame carries support fixture 34 which releasably supports elongate linear pressurized water supply conduit 35 extending between a plurality of sequential spacedly adjacent channel stations. The pressurized water conduits 35 preferably are not interconnected and have closed ends so as to constitute a supply plenum for the channel stations that they service. Each water conduit 35 communicates through a channel station supply line 36 carrying adjustment valve 37 therein to the interior channel defined in each body frame element that the water conduit services. In the instance illustrated, there are two pressurized water conduits 35 extending between each side of a plurality of channel stations to service that plurality of stations. This configuration though desirable is not essential and my invention includes within its scope pressurized water supply systems not having any water conduits 35 and servicing only one channel station or various other arrays of one or more water conduits servicing more than one of such stations. When the water conduits 35 are formed of some reasonably rigid, durable material, it is to be noted that since they are structurally joined to several sequentially adjacent channel stations, those conduits serve to physically interconnect, stabilize and positionally maintain the associated stations relative to each other to aid the action of floats and anchors.

Conditioning system 13 provides conditioning pipe support fixtures 38, in the instance illustrated carried in the middle portion of the horizontal top element 20 of each body frame. Elongate conditioning conduit 39 extends between a plurality of channel stations in such position that it is carried by the support fixture 38 of each station of that plurality. In the instance illustrated, the conditioning conduit is supplied with pressurized water by conditioning system pump 40 having inlet 41 to receive water from watercourse 10 and output conduit 42 having valve 43 therein to controllably pass that pressurized water to the channel of conditioning conduit 39. The pump 40 is serviced by a material input port 44 to allow various beneficiating materials to be injected into the pressurized water passing through output channel 42. The output channel 42 communicates by conduit 47 with the channels defined in the side elements of one or more channel station body frames for dispersement from the body frames of the materials carried by the output channel. It is possible that pressurized water may be supplied to the conditioning conduit 39 by primary pump 32 and this structure is within the scope of my invention, though it is not illustrated in the drawings.

Having thusly described the structure of my apparatus, its operation and use may be understood, Firstly, a system as specified is constructed and its various elements established in watercourse 10, with the channel stations spacedly adjacent each other to allow definition of the periphery of a water channel through which it is desired to direct the passage of migrating fish. Normally this channel will be established through slack areas of dam backwaters to guide fish through those areas and in upstream adjacency to dams to guide fish through passageways or facilities of various sorts to allow their transport past the dam structures. The various channel stations are located in spaced adjacency along this channel and positionally maintained in appropriate array by supporting floats 24 and anchors 26 which are positioned and adjusted according to the common practices heretofore used with such structures to allow them to fulfill their purposes.

The pressurized water system is installed by positioning main pump 32 for positional maintenance and by installing conduits 35 between the various channel stations that they are to service. The water conduits are interconnected to the pressurized water channels defined in each body frame. The conditioning system is similarly installed to complete the system. To render the system operational, the motors powering pressurized water system pump 32 and conditioning system pump 40 are interconnected with an external powering sources (not shown), normally but not necessarily an electrical powering source.

The various parameters of my system are determined by ordinary known engineering principles. The cross-sectional area and configuration of the faster flowing channel defined by the peripheral body frame must be sized, in consideration of the power available for the system and the efficiency of nozzle structures, so as to maximize the average flowage rate between stations and minimize the cost of manufacture and operation of a particular guidance system. This normally has been found to require average waterflows of between two and ten feet per second in the channels between my channel stations. The size of conduits and power consumption of pumps will vary widely in differing watercourse conditions, but for reasonable practicability, the cross-sectional size of my water channel will normally vary from about thirty-five to about one hundred fifty square feet. With channels of this size range, the body frame conduits preferably will range between four and six inches and pressurized water conduits 35 will range between six and eight inches to service ten to twelve channel stations with pressurized water that will be supplied at a pressure of between fifty and one hundred twenty pounds. With reasonable nozzle design and efficiency, this will allow channel stations to be spaced at approximately fifty feet.

It is to be noted that my guidance system may be used not only to guide smolts from their rearing areas through a drainage system to salt water, but also is effective in aiding the upstream migration of adult fish during their spawning migrations. At either time, the natural instincts of the fish tend to cause them to seek faster running areas in a moving watercourse, and since my guidance system creates such areas, it serves its purpose as a guidance system for either downstream or upstream migration. Either migration is important to the survival of salmon in a drainage system, but undoubtedly the system is more important for the survival of smolts because of their greater susceptibility to the damaging and life-threatening forces caused in such systems by dams and other man-made obstacles.

It should further be noted that my system may also be used to create fast moving barrier walls in a water course. As is known, if the velocity of water in a channel is above about twenty to twenty-five feet per second, fish generally and salmon in particular will not enter that area as the faster moving water may cause physical damage and disrupt fish physiology. Such a channel may be created by raising the pressure of water dispersed through the nozzles and appropriately adjusting the distance between channel stations. If such a barrier is to have a wall-like configuration the shape of the channel bodies may be very elongate and the width very narrow.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A guidance system for anadromous fish that provides a faster moving channel in a slower moving watercourse, comprising in combination:

a plurality of channel stations in spaced sequential adjacency in a portion of the watercourse, each said channel station having
a peripherally defined body frame having a closed internal channel communicating therethrough, at least one nozzle carried by the body frame and communicating to the internal channel defined therein to direct water flow from the nozzle toward an immediately adjacent downstream body frame, and means for positionally maintaining each body frame in the watercourse; and at least one pressurized water supply system communicating with the internal channel of each body frame to supply pressurized water, derived from the watercourse in which the faster moving channel is defined, to the internal channels defined in the body frames.

2. The apparatus of claim 1 further having a water conditioning system comprising, in combination:

an elongate conditioning conduit extending between at least some of the body frames of the channel stations with a channel communicating with the channels defined in the body frames, first means for introducing pressurized water into the conditioning conduit, and second means for introducing environmentally enhancing materials into the conditioning conduit.

3. The apparatus of claim 1 wherein the means for positionally maintaining each body frame comprise at least one float supporting the body frame of at least one of the plurality of channel stations, and at least one anchor supported on a channel defining the watercourse in which the body frame is supported to positionally maintain at least one body frame of the plurality of channel stations.

4. The apparatus of claim 1 wherein the pressurized water supply system includes, in combination:

two similar pressurized water supply conduits, one said conduit carried on the vertical side elements on the same side of adjacent body frames, each said conduit forming a closed manifold for distribution of water to the channels defined in the body frames, and a pump supported in the watercourse by float and anchor means and having an inlet from the watercourse outside the faster moving channel defined in the watercourse and outlets communicating to each pressurized water supply conduit.

5. A method for aiding and directing the passage of anadromous fish through a slower moving water body of a drainage system by creating a faster moving channel in the water body, comprising in combination:

establishing a plurality of channel stations in sequential spaced relationship along a faster moving channel to be defined in the slower moving water body, each said channel station having a peripherally defined body frame with a medial orifice and a channel communicating through at least a portion of the body frame, float and anchor means for positional maintenance in a water body, and at least one nozzle carried by the body frame and communicating with the channel defined therein to disperse water toward an immediately adjacent downstream channel station; and supplying pressurized water derived from the water body to the channels communicating through the body frames for dispersement through the nozzles connected therewith.

6. The method of claim 5 further including:

supplying environmentally beneficiating materials through a conditioning system having at least one conduit and a pressurized water supply to carry the environmentally beneficiating material to the channel of at least one of the body frames for dispersement through the nozzles carried thereby.

* * * * *